March 10, 1964 E. J. BONANNO 3,124,656

AUTOMATIC NUMBER IDENTIFICATION

Filed Oct. 7, 1960 6 Sheets-Sheet 1

INVENTOR.
Ernest J. Bonanno
BY
C. A. Gulbrandsen
Atty.

INVENTOR.
Ernest J. Bonanno
BY
C. A. Gulbrandsen
Atty.

INVENTOR.
Ernest J. Bonanno
BY
C. A. Gulbrandsen
Atty.

INVENTOR.
Ernest J. Bonanno
BY C. A. Gulbrandsen
Atty.

INVENTOR.
Ernest J. Bonanno
BY C. A. Gulbrandsen
Atty.

March 10, 1964 E. J. BONANNO 3,124,656

AUTOMATIC NUMBER IDENTIFICATION

Filed Oct. 7, 1960 6 Sheets-Sheet 6

INVENTOR.
Ernest J. Bonanno
BY C. A. Gulbrandsen
Atty.

United States Patent Office 3,124,656

Patented Mar. 10, 1964

3,124,656

AUTOMATIC NUMBER IDENTIFICATION

Ernest J. Bonanno, Roselle, Ill., assignor to Automatic Electric Laboratories, Inc., Northlake, Ill., a corporation of Delaware Filed Oct. 7, 1960, Ser. No. 61,302
10 Claims. (Cl. 179—18)

The present invention relates to telephone systems and particularly to automatic number identification of telephone substations located in tributary telephone offices. Specifically it relates to the identification of a calling station in a tributary office and ultimate transmission of this information, as well as the number called by the station, to an automatic toll ticketing center.

Systems in this field have been designed to pass the calling numbers as obtained from the switching equipment in a tributary office to the ticketer processing the call at a toll ticketing center. However, in earlier designs of this sort the trunk circuits used were self contained and performed the function of dial identification, access to a common detector, storage of the calling number as obtained from the detector, and out pulsing of the calling number to the ticketer as well as regular outgoing trunk functions such as pulse repeating and supervision. In the instant invention the circuits used remove the relays required for detection control and out pulsing of the calling number from the individual outgoing trunks and place them in a common sender. This makes it possible to reduce the size of the outgoing trunks by approximately 50% as well as centering these functions in common shared units.

The object of this invention is the provision of compact and economical equipment for automatic identification of the number of a telephone station in a tributary office.

A primary feature of this invention is the provision of an outgoing trunk for use in providing automatic number identification in tributary offices usable with a common sender for out pulsing of the calling number as obtained from the detector to the ticketer at the distant office.

A record feature shall be the inclusion in the trunk circuit of facilities for switching control leads to a sender for detection and out pulsing.

Another feature included in the trunk circuit are facilities for releasing the sender upon completion of its function returning it for use by other trunks in the group.

Still another feature is the inclusion of a sender allotter to provide means for allotting either of two senders to find trunk circuits calling for service.

A further feature is circuitry for allowing the allotter to remain with the sender until a release signal is received from the circuit.

An additional feature of applicant's invention is the inclusion of sender circuitry designed to permit sending of the calling subscriber's number in a tributary office to a ticketer in a distant automatic toll ticketing office. Another feature is the inclusion of circuitry in the sender to advise a sender allotter that it has completed its function allowing it to prepare a second sender for allotment to the next call.

Figure 1:
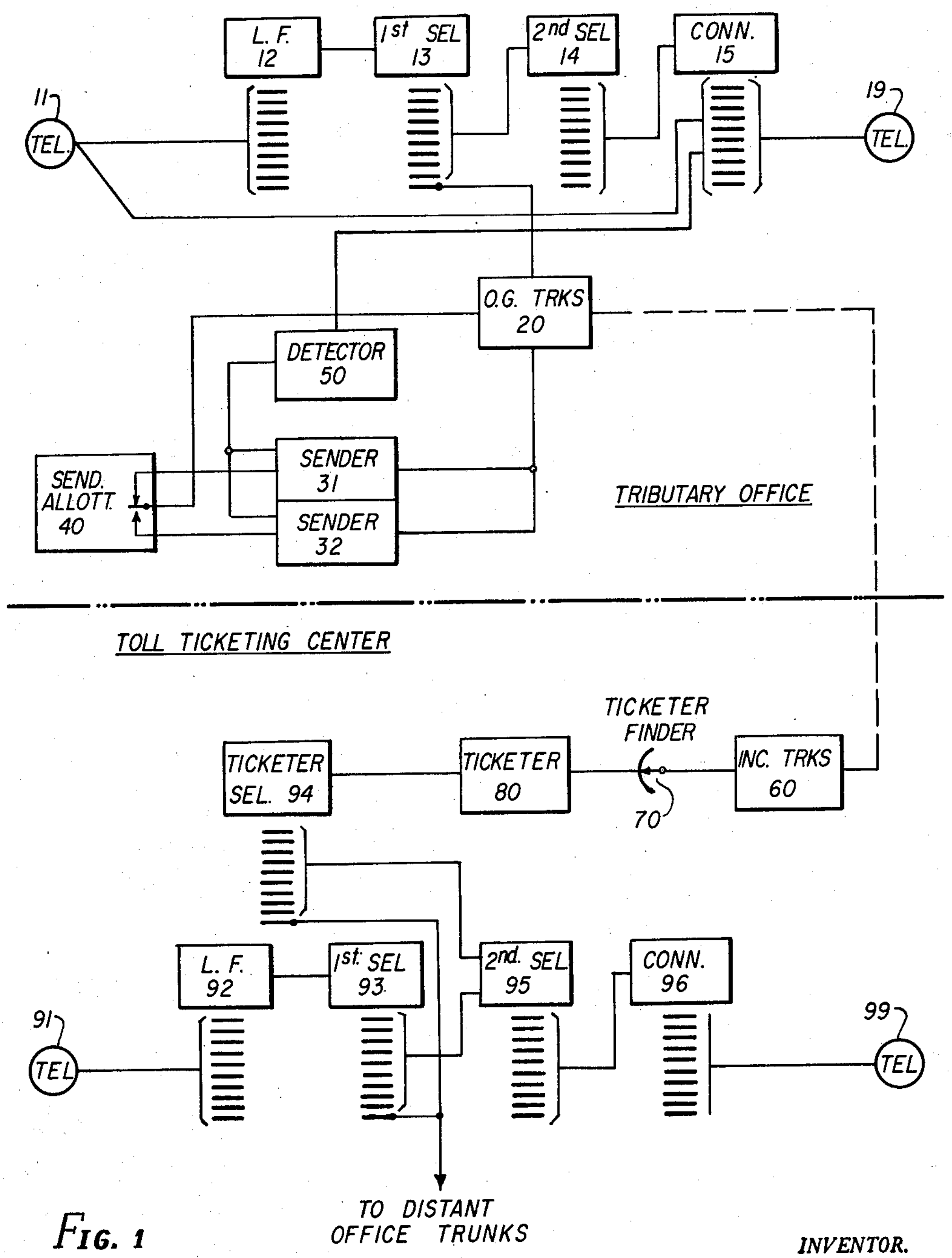
FIGURE 1 is a block diagram of a telephone system including a tributary office and a toll ticketing office embodying circuits according to this invention.
Figure 2:
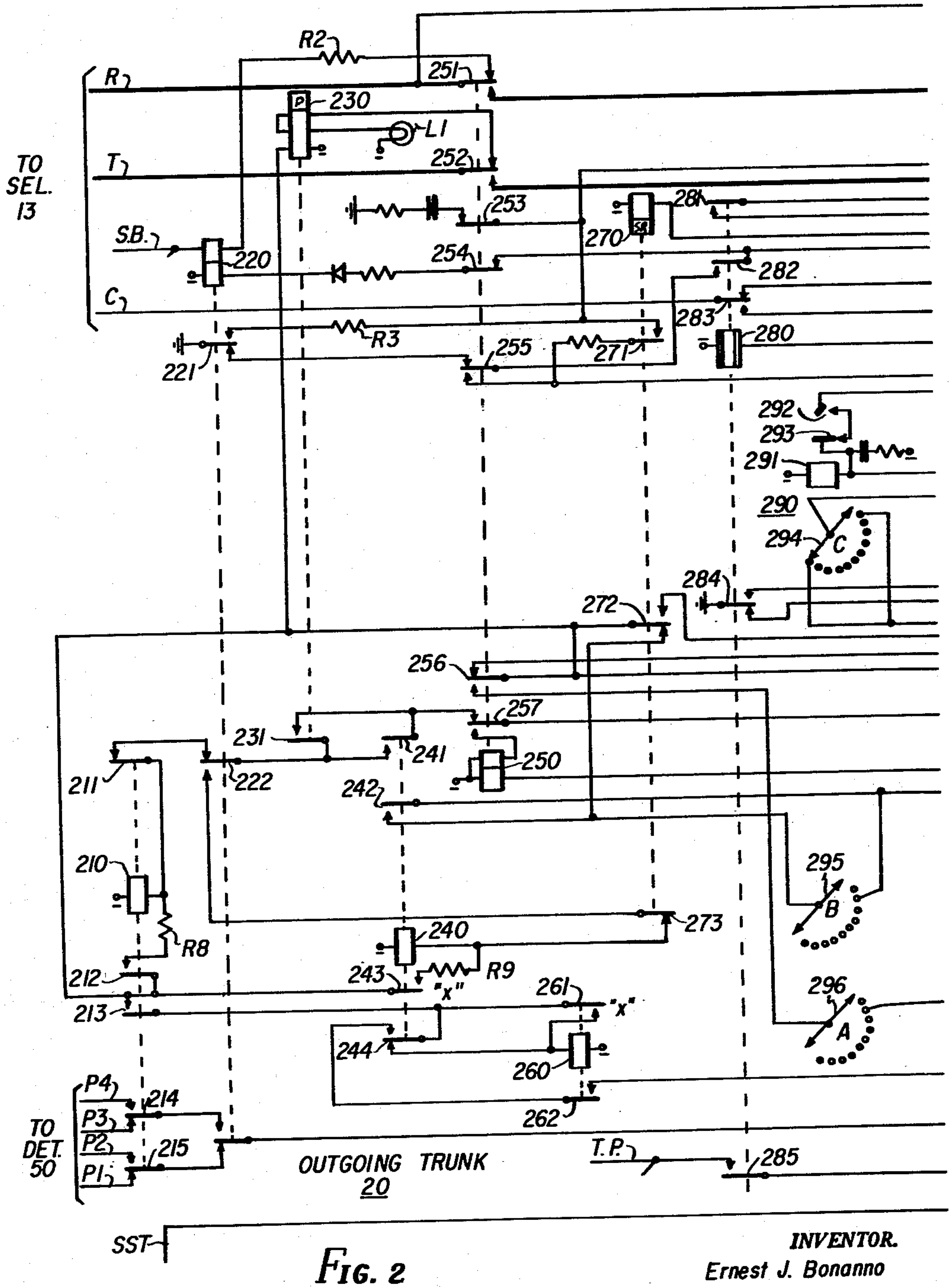
FIGURE 2 is a schematic circuit diagram of a portion of an outgoing trunk circuit in accordance with this invention.
Figure 3:
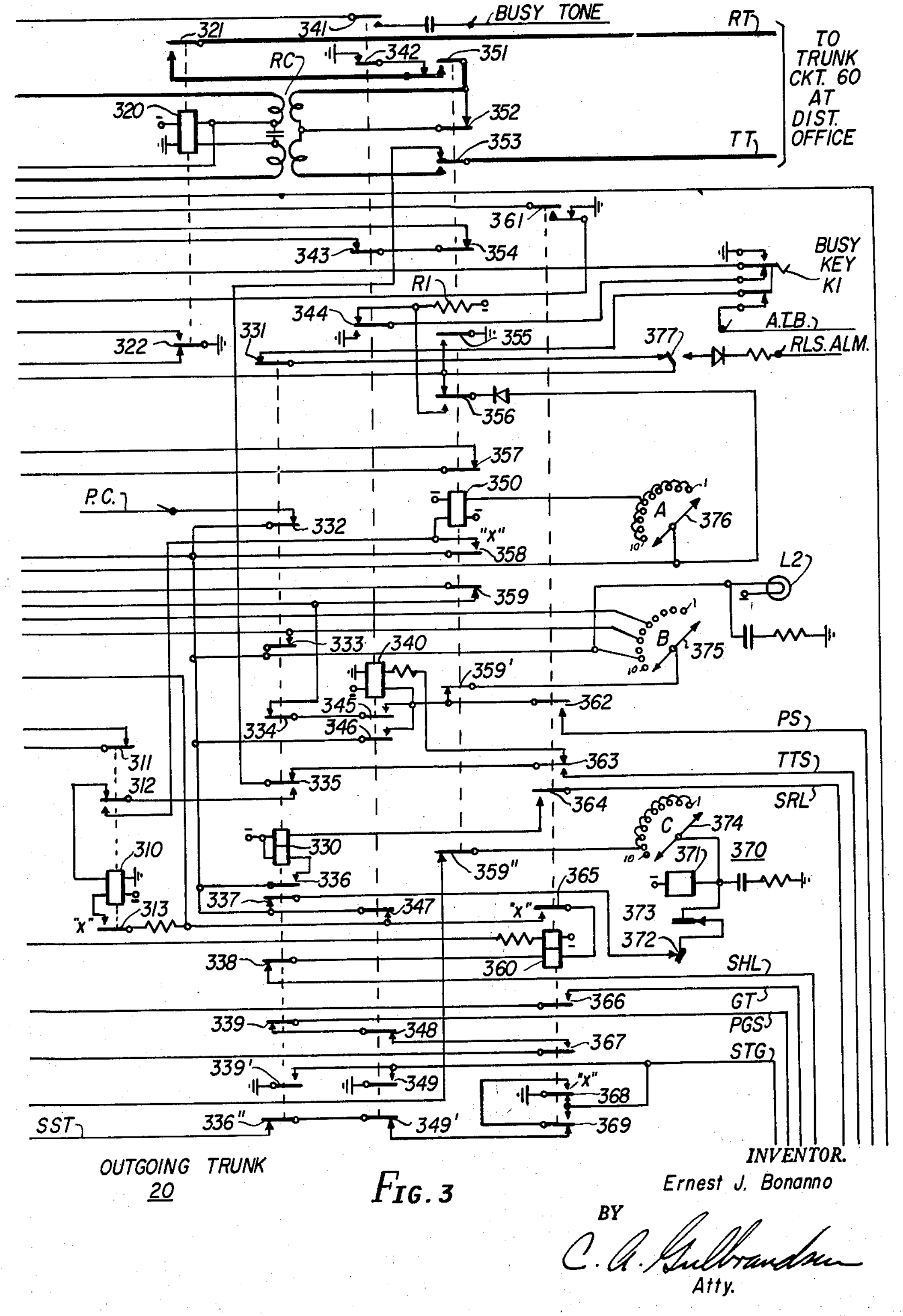
FIGURE 3 is a schematic circuit diagram of the remainder of the above outgoing trunk circuit.

The circuitry shown in block diagram form in FIGURE 1 is arranged for two wire metallic operation, it discloses in elementary form an automatic dial office of the Strowger or step-by-step type designated the tributary office and consisting of calling substation 11, line finder 12, first selector 13, second selector 14, connector 15, and called subscriber 19. Telephone calls within the tributary office may be placed and received in a purely conventional manner. However to place a toll call on a dial direct basis through the automatic toll ticketing center the subscriber 11 in the tributary office dials a special number accessing the selector level (1) connecting it to one of the outgoing trunks in the trunk group 20. These trunks are connected to a pair of senders 31 and 32 as well as detector 50 and sender allotter 40. The outgoing trunk circuits are also connected to the automatic toll ticketing center and particularly to incoming trunks 60 at the toll center which have access to a ticketer 80 through ticketer finder 70.

After the incoming information is received from the tributary office through the incoming trunk and recorded in the ticketer the call is extended to by the ticketer selector 94 either to a called station 99 in the toll ticketing center, or to a distant office over an outgoing trunk circuit.

Referring now to FIGURE 1 for a general description of the operation. When outgoing trunk 20 is seized it immediately seizes ahead for a ticketer 80 via incoming trunk 60 and the associated pre-selecting rotary switches 70.

The first digit in the trunk is repeated to the ticketer, if the ticketer is not connected when the digit is started a mark from the incoming trunk causes the outgoing trunk to return busy tone to the calling party until a circuit to the toll ticketing center is open.

The sender 31 or 32 may be considered as part of the detector 50 and if it were not for the rotary switch access and rotary switch scanning of the output of the detector one sender could be directly connected to the detector and for tributary operation they could be considered as one. However due to the greater possibility of trouble occurring in the rotary switches than the relays the sender is provided in duplicate, calls being allotted to the senders alternately. The allotter 40 also times the function of the sender. Should a sender fail to complete its function within 6 to 12 seconds the alternate sender is brought in to serve the call and an alarm is given. The sender that failed is locked out of service. The sender that is allotted to serve the call is also connected to the detector 50.

When the sender is connected to the trunk it immediately starts the detection cycle. When detection has been completed, the sender 31 or 32 starts to scan the output of the detector. It should be noted at this point that the sender is holding the detector 50 and reading its output. There is no storage in the sender in which to register the ouput of the detector 50 therefore it is necessary to hold the detector.

Since the sender must pulse out thirty-one pulses and does so at the rate of 12 pulses-per-second, each call occupies the detector and sender for approximately five seconds. For a better understanding of this invention reference should now be made to FIGURES 2, 3, 4, 5 and 6 taken in combination as shown in FIGURE 7.

A calling subscriber 11 places a telephone call in the usual manner dialing a number assigned for toll service. The switching equipment operates in a conventional manner to axis a first selector 13 with bank contacts connected to trunk circuit 20. The circuit is marked idle by the presence of battery on lead C. The battery is extended through resistance R1, make contact 344, break contact of busy key K1, contact 283 over the C lead to the selector. When seized the tip (T) side of the subscriber's loop is closed through break contact 252 through relay 230 and lamp L1 to battery. The ring side of the loop is closed by break contact 251, resistance R2, the upper winding of relay 220 to spotter battery. Completion of the loop operates relay 220 closing ground through make contact 221 through resistance R3 to the upper winding of relay 320. Relay 320 operates by placing ground over break contact 342, break after make contact 351, make contact 321 upon lead RT extends to the incoming trunk circuit 60 at the toll ticketing center seizing a distant incoming trunk.

Operation of relay 320 extends ground over make contact 322 to relay 280 causing it to operate. Operation of relay 280 extends ground over make contact 283 to the C lead extending bank to the selector 13. This ground marks the circuit as busy and holds the preceding switching equipment. Operation of relay 280 further removes ground from lead ATB, the all trunks busy indicating lead, break contact 284, and extends ground over make contact 284 and break contact 332 to lead PC which is the peg count or register indicating lead. The supervisory lamp L2 is also lighted by the same ground. 10 IPM ground pulses are extended over make contact 285, break contact 359″, the contacts 1 through 9 of level C on rotary switch 370. Ground is also extended to the lower winding of relay 220. Completion of this circuit to the lower or bias winding renders relay 220 inoperative. The rotary switch 370 operates to restore its interrupter springs 373 and its rotary off normal springs 372 stepping its wipers 374, 375 and 376, to the number 1 bank contacts on levels A, B and C. 10 IPM ground pulses on contact 1, of level C of rotary switch 374 are extended back over wiper 374 to the motor magnet 371 of rotary switch 370.

The circuit of the instant disclosure is arranged to provide automatic identification for four party telephone lines. With four party identification no digit need be dialed into the circuit for identification purposes. With four party identification the first two parties are substations equipped with standard dials. Party one employs a standard subset while party two provides a resistance ground "tip" mark through the dial shunt springs during dialing. Parties three and four are equipped with special SATT dials similar to those shown in U.S. Patent 2,410,520 to J. E. Ostline issued November 5, 1946, which send out a ground pulse on lead T to identify the calling party.

If the calling party is party number two, resistance ground is extended by the T conductor through relay 230 during the line breaks of the first dialed digit. This resistance ground causes reversal of the current in the first and second windings of relay 230 thereby allowing relay 230 to operate. Operation of relay 230 closes a path from ground over make contact 284, break contact 337, break contact 347, break contact 257 and make contact 231 to break contact 222 and break contact 211 to relay 210 causing it to operate. When relay 210 operates it operates relay 261 by extending ground by a path extending through make contact 284, make contact 333, make contact 213, break contact 244. Operation of relay 210 also prepares a path to lead P2 to identify a party two at make contact 215.

If the calling party is number one, resistance ground is not present on the T conductor and consequently relays 230 and 210 now operate. Thus party identification ground may be extended over break contact 215 to the P1 lead at such time as relay 360 operates.

In the case of party three a special SATT dial sends out a ground pulse on the tip side of the line at the end of the first digit when relay 220 reoperates. Relay 230 operates from this ground pulse in turn operating relay 240 by sending ground to relay 240 over a path extending to ground over make contact 284, break contact 347, make contact 257, make contact 231, make contact 222 and break contact 273. Thus it is obvious from operation of relay 240 a path is prepared to lead P3 for identification of party number three.

Party number four at the substation employs a special SATT dial that sends out a ground pulse over the T conductor during the next to the last line closure during which time relay 220 is operated. Relay 230 operates from this ground pulse, operating relay 240. When relay 220 restores on the last pulse ground is extended to relay 211. When relays 210 and 240 operate a circuit is prepared to lead P4 to identify party number four.

Since the subscriber does not have to dial an identification digit the first digit dialed in the placing of a toll call is the first digit of the called office or area code. Relay 220 follows the dial pulses and when at normal opens the operating path to the upper winding of relay 320 at make contact 221 and provides the necessary operating ground over break contact 221 to slow to release relay 270. When relay 320 restores ground is removed from lead RT and extended to the incoming trunk 60 at the toll ticketing center as well as removing the operating ground at make contact 322 from relay 280. Relay 270 operates on the first pulse and extends operating ground through make contact 272, break contact 359, over the normal bank contacts level C of rotary switch 290, over wipers 294 through contacts 357 to the motor magnet 291 of rotary switch 290. Rotary switch 290 now operates. Relays 280 and 270 remain operated during pulsing due to their slow to release characteristics. Relay 320 follows relay 220 and repeats the dialed digit to the distant incoming trunk 60 at the automatic toll ticketing center over lead RT. Upon completion of the digit relay 220 operates extending ground over make contact 221, the upper winding of relay 320 closing ground through make contact 321 to lead RT. After its slow to release interval relay 270 restores opening the operating path to rotary switch 290. Rotary switch 290 restores and steps its wipers 294, 295 and 296 to bank contacts number 2 on levels C, B and A respectively.

When the rotary switch 290 operated stepping its contacts to bank contact number 2 an operating path is completed via level B of the rotary switch to the lower winding of relay 250 causing it to operate. Operation of relay 250 closes the incoming conductors T and R at make contacts 251 and 252 through to the upper and lower windings of relay 320. At the same time ground is extended over make contact 256, wipers 295 and bank contact 2 of level A of rotary switch 290 to the upper winding of relay 360 causing it to operate. Relay 220 now restores. Relay 360 operates at its X contacts 365 and 368 only extending ground over contacts 365; through the lower winding of relay 360, break contacts 338, over conductor SHL and transfers ground at contacts 368 from lead STG to lead ST to seize the sender allotter 40. Relay 320 follows the dial pulses of the remaining digits of the called number and repeats them to the distant incoming trunk over lead RT. Relay 280 is opened each time 320 restores, and it remains operated because of its slow to release characteristics. Relay 270 operates on the first pulse of each digit when relay 320 restores. It remains operated during the digit because of its slow to released characteristics and restores at the end of each digit when 320 reoperates. Rotary switch 290 is no longer effected and its wipers remain on bank contacts number 2.

Figure 4:
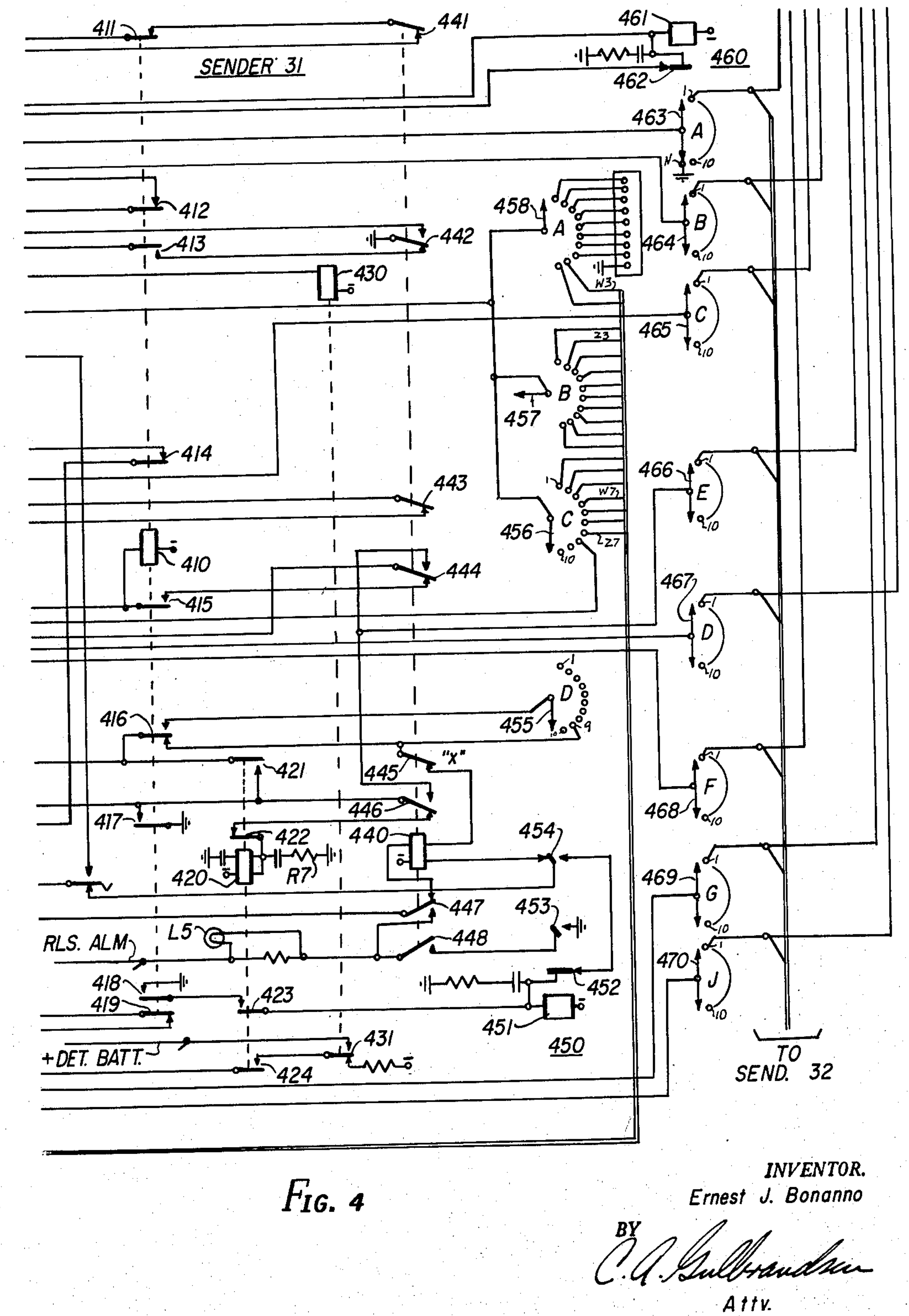
FIGURE 4 is a schematic circuit diagram of a portion of a sender in accordance with applicant's invention.
Figure 5:
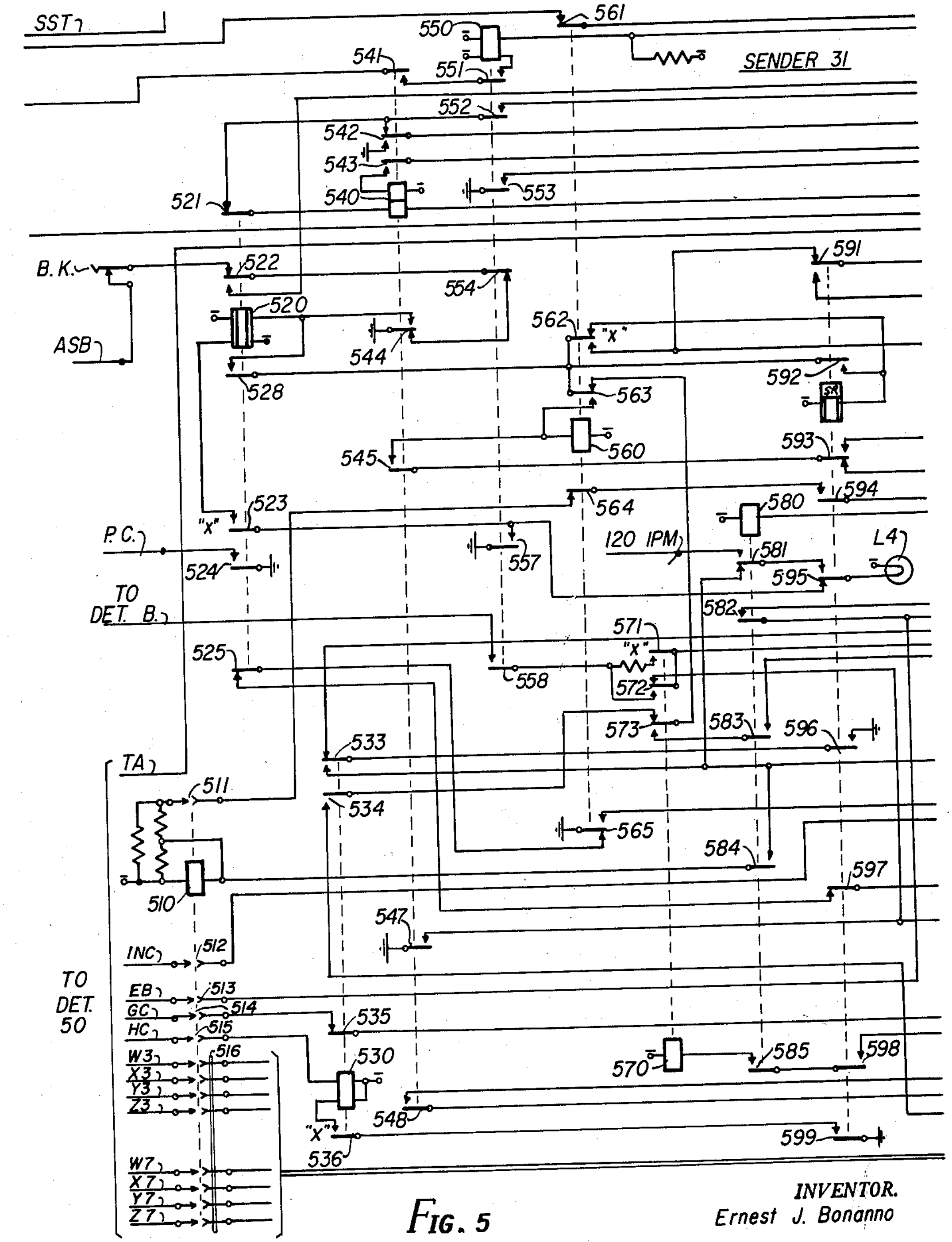
FIGURE 5 is a schematic circuit diagram of the remaining portion of the above sender.
Figure 6:
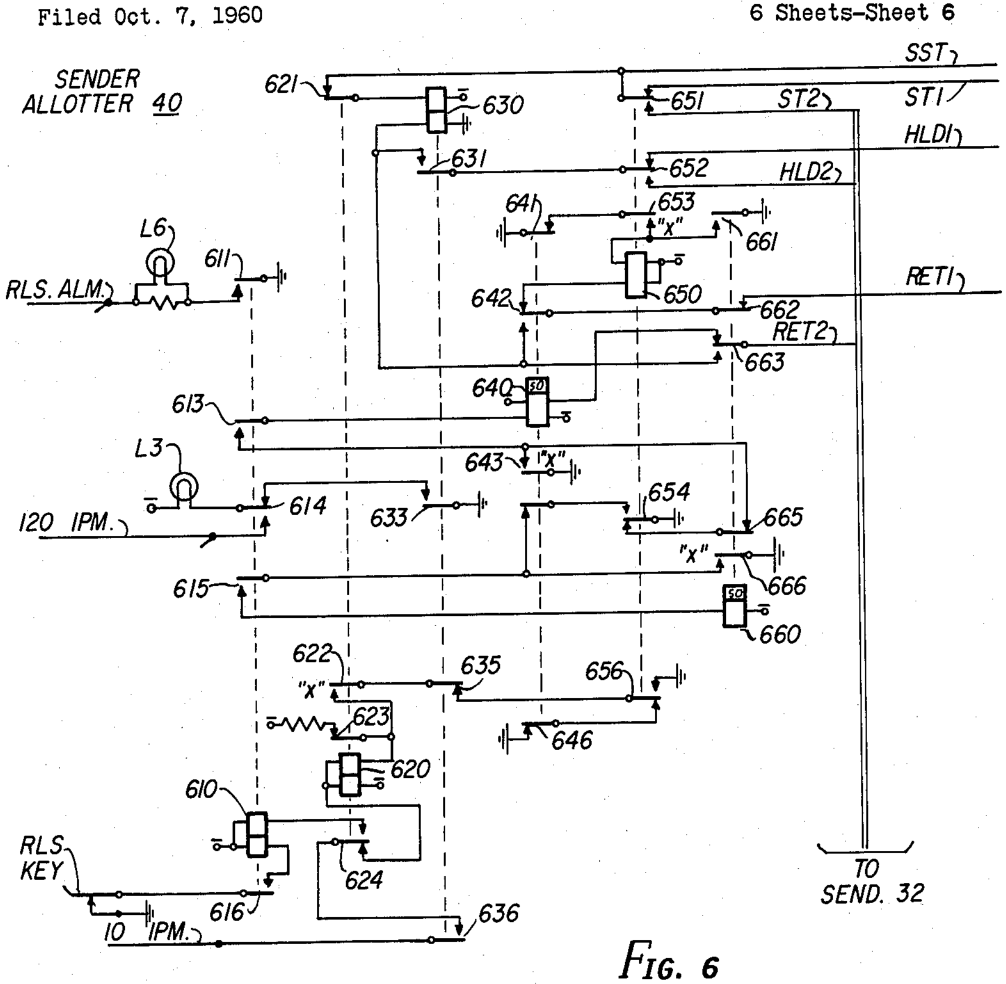
FIGURE 6 is a schematic circuit diagram disclosing a sender allotter in accordance with applicant's invention.
Figure 7:
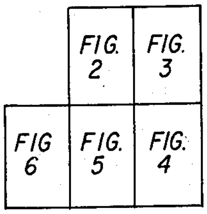
FIGURE 7 shows the manner of arranging FIGURES 2 to 6 inclusive for an understanding of the invention.

As noted before operation of relay SA placed ground on lead SST, this ground is extended to sender allotter 40 as shown in FIGURE 6 and specifically through make contact 621 to the upper winding of relay 630. Ground is also extended over break contact 651 to seize sender 31, applying ground to the upper winding of relay 550 to sender number 31 as shown in FIGURES 5 and 4 through relay contacts 561, 411, and 441. Relay 630 operates extending ground through the lower winding of relay 630 over make contact 631, break contact 652 to lead HLD. Ground is also returned by relay 630 over contact 633, through break contact 614, to light lamp L3, and to connect relay 620 through break contact 624 and make contact 636 of lead TP (10 IPM ground pulses).

Within six seconds relay 620 operates its X contacts connecting both windings in series, operates fully and opens a circuit path to the upper winding of relay 630 at contact 621. Lead TP is transferred by operation of relay 620 to relay 610. The allotter circuit 40 remains in this condition until released by the sender 31.

Ground on lead ST1 operates relay 550 in sender 31. Operation of relay 550 extends ground over make contacts 542, to rotary switch 460, over wiper 463 to contact 11 on level A through make contact 542 and make contact 552 to motor magnet 461 through its interrupter springs 462. Operation of relay 550 also removes ground from the all sender busy lead by opening break contacts 554 and applies ground at make contact 557 to light the supervisory lamp L4. Level A of rotary switch 460 is associated with the STG leads of the trunks served by the sender and each trunk not requiring service has ground placed on its STG lead. Rotary switch 460 steps in a self-interrupted manner to its bank contacts number 1 and tests the associated STG lead. If ground is encountered rotary switch 460 steps to the next bank contact. Self-interrupter stepping of rotary switch 460 continues until the outgoing trunk requiring service as indicated by the absence of ground on lead STG is found.

When the trunk requiring service is found, in this case trunk 20, the short circuit is removed, break contact 542 and relay 540 operates in a series with the motor magnet 461 of rotary switch 460, locking over its upper winding ground is returned over lead SHL from the outgoing trunk circuit 20. Operation of relay 540 extends ground over make contact 542 and the wipers 463 of rotary switch 460, over the appropriate bank contact, in this case number 1, to the outgoing trunk circuit 20 by way of lead STG. In addition at make contact 544 ground is extended to the upper winding of relay 520 initiating its operation. Relay 560 has an operating circuit prepared for it at make contacts 545 extending over break contact 593 and wipers 465 on level C of rotary switch 460. This latter path provides facilities for indication of a possible ground pulse signal from the trunk circuit 30. Lead CS is grounded at make contact 547 providing ground at the outgoing trunk 20 by way of wiper 467 and the bank contacts on level B as well as operating relay 440. Relay 550 is locked to ground extended from the allotter 40 over lead HLD at make contact 541 and make contact 551 to the lower winding. Relay 520 when operated locks over its X contact 523 to ground on the lower winding placing ground at make contacts 524, further extends ground at make contact 526 to break contact 562 to slow to release relay 590.

The operation of relay 520 removes the operating ground at break contact 525 from the lower winding of relay 440 as well as opening the operating circuit to the lower winding of relay 540 at break contact 521. After its slow to operate interval relay 590 operates and locks connecting relay 430 at make contact 591 to wipers 456, 457 and 458 of rotary switch 450. Operation of relay 590 transfers the operating circuit for relay 560 from lead GT extending to the outgoing trunk circuit 20 to lead INC at contact 593 thus preparing the circuit for a possible incomplete detection mark over lead INC. Relay 580 is prepared for operation by closure of contact 594.

The sender 31 is now in condition for initiation of the detector cycle. Relays 440, 550, 540, 520 and 590 are operated. Relay 580 is closed in series with the relay in the detector 50 which is similar to that shown in the copending application of J. Ostline, Serial No. 625,833 filed December 3, 1956.

Operation of relay 580 completes at make contacts 584 an operating circuit for bar relay 510. 120 IPM ground pulses are extended to supervisory lamp L4 at make contact 581 and relay 410 is connected to make contact 582 to lead EB. Relay 570 is connected to lead GC at make contact 585 upon operation of relay 580. Bar relay 510 now operates and connects the detector leads to the sender at contacts 512, 513, 514, 515 and 516. When bar relay 510 operates ground is returned to the detector 50 over lead GC operating relay 570. Relay 570 operates first at its X contacts 571 and operates fully placing detector battery on lead CS at contacts 572 to identify the calling line 11 to the detector 50 while placing ground on lead PGS at make contact 573 extending same over wipers 468, the bank contacts on level F of rotary switch 460 to the outgoing trunk circuit 20, thus providing a party identity mark.

In the course of the detection cycle the detector grounds the codel leads W3 through Z7 marking in codel code (one or two out of five indications) representative of the last five digits of the calling parties number. Upon completion of the detection cycle ground is returned over lead EB to relay 410. Relay 410 operates locks to ground over its make contacts 415, places ground on lead TA at make contact 413, operates relay 420 by extending ground over contact 417, releases relay 570 by opening the operating path at break contact 419, as well as opening the operating path to relay 550 at its upper winding, break contact 411, disconnects relay 560 from lead IMC, at break contact 414. Relay 570 restores placing detector battery at ground on lead CS and opens lead PGS to the outgoing trunk 20.

The detector 50 and the sender allotter 40 are held during out pulsing of the calling number. Relays 440, 540, 520, 590 and 410 are operated. Relays 550, 580 and 510 may be operative. Relay 420 operates self-interruptedly from ground provided by relay 410 and when operated lights supervisory lamp L5 as well as extending operating ground at contacts 423 to motor magnet 451 of rotary switch 450 as well as closing positive or negative resistance battery on lead TTS via wipers 469, bank contacts on level G, and rotary switch 460. Each time relay 420 restores the supervisory lamp L5 is extinguished, lead TTS is opened and rotary switch 450 restores and steps to the next set of bank contacts. Each time that rotary switch 450 steps to a bank contact that is marked with a codel ground from the output of the detector 50, relay 430 operates and replaces negative resistance battery with positive resistance battery, and the next operation of relay 420 closes a positive battery pulse on lead TTS to the outgoing trunk 20. Negative battery pulse results in a "step the sequence switch mark to the ticketer 80 at the toll ticketing center and the positive pulse steps the sequence switch and marks the corresponding codel relay in the ticketer 80." In this manner the calling number is sent to the incoming trunk 60 which transmits it to the ticketer 80.

After the last digit of the calling number has been sent, the rotary switch 450 steps its wiper under control of relay 420 to bank contact number 8 where relay 430 is operated by way of a ground at bank contact number 8, level C. Relay 430 operates and prepares a negative battery pulse to the outgoing trunk 20. The next operation of relay 420 extends a final step and mark pulse to the trunk and completes a circuit to the motor magnet of switch 450. The final step and mark pulse is a control pulse that initiates further operation of the ticketer 80 to record the pertinent information. Rotary switch 450 operates. Relay 420 restores and opens rotary switch 450 which restores and steps to the next set of bank contacts opening the operating path to relay 430. Relay 420 reoperates extending an operating circuit to motor magnet 451, and short circuits relay 420 by closing direct ground via bank contact number 9 of level D of rotary switch 450 to resistance battery through R7. Rotary switch 450 operates. Relay 440 restores, opens the operating path to relay 410, places ground on lead SRL which extends to the outgoing trunk by way of wipers 466 and the bank contacts on level E of rotary switch 460 to indicate the end of sending. Relay 440 also places ground on the RLS ALM. Lead 7 lights lamp L5 and removes the operating path from relay 420, removes the operating path to the upper winding of relay 550, replaces ground on lead TA and removes ground from lead RET1 at contacts 442 to release the sender allotter XX and restores relay 580 to normal by opening the operating circuit at contact 443. Relay 420 restores opening the circuit to the motor magnet 451 of rotary switch 450. Rotary switch 450 restores in stepping its wipers to bank contact number 10. Relay 410 restores. Relays 580 and bar relay 510 also restores at this time if they still remain in an operated condition.

When the ground mark is placed on lead SRL the outgoing trunk 20 removes ground from conductor SHL which opens the operating path to the upper winding of relay 540. Relay 540 restores removing ground from the upper winding of relay 520 at make contact 544, and also with the operating ground at relay 590. Operation of relay 540 also breaks the operating circuit to the lower winding of relay 550. Relay 550 restores opening the operating path to the lower winding of relay 520. Relay 520 restores closing a homing circuit to rotary switch 450. Rotary switch 450 steps home restoring the circuit to relay 440 and off normal springs 454, opening leads RLS and extinguishing lamp L5. Rotary switch 460 remains in its present position until the sender 31 is seized again. It is not necessary to home rotary switch 460 since ground present on the STG lead of an idle outgoing trunk 20 will cause rotary switch 460 to step in search of the next trunk that requires a sender.

Referring now to the sender allotter 40, the sender 31 returns ground over lead RET1 as noted above, relay 650 operated at its X contacts 653 when operating fully locks to its upper winding. This transfers lead SST from the trunk circuit from conductor ST1 extending to the sender 31 to the conductor ST2 going to the second sender 32 at contact 651, and the lower winding of relay 630 is transferred from lead HLD1 extending to the sender 31 to lead HLD2 going to sender 32, at contacts 652. When sender 32 is idle, resistance battery is not present on lead HLD2 and relay 630 restores, extinguishing supervisory lamp L3, restores relay 620 and connects 10 IPM ground pulse source at make contact 636 to the upper winding of relay 610 stopping the timing cycle. Relay 620 restores connecting lead SST to the upper winding of relay 630 at break contacts 621. This circuit remains in this condition until another trunk call is placed at which time sender 32 is called into service.

The next time a trunk call is placed ground is received over lead SST including the operating path to the upper winding of relay 630 and seizing the sender 32 over lead ST2. Relay 650 as noted previously is in the operated condition. Relay 630 operates and the operation that follows is the same as described above. When released by sender 32 ground is received over lead RET2, to the upper winding of slow to operate relay 640. After this slow to operate interval relay 640 operates at its X contacts and operates fully opening the operating path to both windings of relay ALT1 at contacts 641 and 642 and also breaks the operating path to relay 620 by removing ground at contact 646. Relay 650 restores transferring the lower winding of relay 630 to lead HLD1. Relay 620 restores returning lead SST to the upper winding of relay 630 and transfers lead TP 10 IPM to its own lower winding. Hence sender 31 is now idle, resistance battery is not present on lead HLD1 and relay 630 restores, opening the operating circuit to lead HLD1 at its lower winding, extinguishing supervisory lamp L3 and opens lead TP at make contacts 636. With the sender 32 released, ground is removed from lead RET2 removing the operating path to the lower winding of relay 650. Relay 650 restores connecting lead RET1 to the lower winding of relay 650 at break contact 642. The circuit is now at normal and remains in this condition until another trunk calls for service at which time sender 31 will be called into service as described above.

Turning now to the trunk circuit 20, when sender 31 found the trunk circuit 20 in use, resistance battery was extended to the lower winding of relay 360 over lead SHL from the sender. Relay 360 operates connecting lead C to lead CS at contacts 361. Lead TT transferred from resistance ground to lead TTS at contacts 363 and the upper winding of relay 330 is connected to lead SRL at make contact 364. Party identification leads are connected to lead PGS at contact 367 and ground is placed on lead STG at contacts 369 and ground is removed from lead SST at break contact 369.

During the cycle, detector battery received over lead CS from the sender 31 is extended to lead C. Ground via lead PGS is closed to the appropriate party lead P1, 2, 3 or 4 to identify the calling party to the detector 50. When detection is completed the sender replaces detector battery ground on lead C and opens the party identification lead by removing ground from lead PGS.

Sending of the calling number takes place after the second digit has been dialed. The sender extends a series of 31 pulses (7 digits on a codel basis and three control pulses over lead TT). These pulses are either negative to indicate step the sequence switch or positive to indicate step the sequence switch and mark a codel relay in the ticketer 80. When all of the digits of a calling number have been sent to the succeeding equipment, ground is returned to the upper winding of relay 330 to lead SRL from the sender 31. Relay 330 operates locking to its lower winding and transfers lead TT from lead TTS via the upper winding of relay 310. Operation of relay 330 removes ground from the peg count lead at contacts 332 and also opens the operating circuits to relays 210 and 240, closing a multiple ground to lead STG at contacts 339 to keep the trunk mark busy to other sender 32 during their hunting intervals and removes ground from lead SHL by opening contact 338 to release the sender 31. Relays 210 and 240 restores. Relay 360 restores and transfers lead C from lead CS to ground at contacts 361.

Upon receiving the resistance ground mark on lead TT, the trunk circuit 60 at the distant automatic toll ticketing office returns resistance battery over lead TT to operate relay 310 at its upper winding. Relay 310 operates locking to its lower winding and transfers lead TT from its upper winding to the lower winding of relay 350 changing the state of lead TT from resistance ground to resistance battery. Upon receiving resistance battery on lead TT the incoming trunk 60 returns ground to the lower winding of relay 350. Relay 350 operates locking to its lower winding and opening lead TP to motor magnet 371 at break contacts 359″. Relay 350 further opens the original operating circuits to the motor magnets of rotary switches 290 and 370 at break contacts 357 and 359″. Ground is placed on the RLS ALM, lead, the outgoing line loop is closed across repeat coil RC at contacts 351 and 353 to complete the transmission circuit and closes a homing circuit to motor magnet 291 and rotary switch 290. Rotary switch 290 homes and closes the homing circuit to rotary switch 370. Rotary switch 370 homes and opens the RLS ALM lead. Switch through is completed.

The outgoing trunk circuit 20 is arranged for use with an incoming trunk circuit 60 which gains access to ticketers 80 on a pre-selecting basis. A busy condition is marked by battery on lead TT. Relay 340 operates prior to seizure and grounds lead C to mark this circuit busy and prevent seizure. If however the incoming trunk circuit 60 is marked busy after the circuit has been seized battery is returned to relay 340 via lead TT. Relay 340 operates and places busy tone on lead R at contacts 341.

Release of the outgoing trunk circuit 20 is under control of the calling party. When the calling party disconnects the line loop is opened to relay 320. Relay 320 restores opening lead RT at contacts 321 and restores relay 280 to normal by removing ground from make contact 322. After its slow to release interval relay 280 restores opening the operating paths to relays 250, 350, 310 and 330. It extinguishes lamp L2. Relays 250 and 310 restore. Relay 350 restores and replaces ground with resistance battery on lead C. Relay 330 restores. The circuit is now at normal.

What is claimed is:

1. In an automatic toll ticketing telephone system: a first office including, an outgoing trunk, a calling station identified by a directory number and including a calling device, first switching means connected to said calling station operated in response to operation of said calling device to extend a circuit connection to said outgoing trunk, a plurality of sender means, sender allotter means connected to said plurality of sender means and to said outgoing trunk operated in response to the connection of said calling station to said outgoing trunk to connect a selected one of said sender means to said outgoing trunk, calling station identification means connected between said first switching means and said plurality of sender means operated in response to the operation of said calling device to transmit the calling station directory number to said selected sender means, said selected sender means operated in response to receipt of the calling station directory number to repeat said number to said outgoing trunk; a second office including an incoming trunk, a called station identified by a directory number, toll ticketing equipment connected to said incoming trunk, and second switching means connected to said toll ticketing equipment operable to extend a circuit connection to said called station; a trunk line connecting said outgoing trunk to said incoming trunk; said outgoing trunk operated in response to the combined operation of said calling device and the reception of the calling station directory number to transmit the directory numbers of said calling and called stations through said incoming trunk to said toll ticketing equipment at said second office; said toll ticketing equipment operated in response to reception of said directory numbers to record said numbers and to extend said called station directory number to operate said second switching means to extend a circuit connection to said called station.

2. An automatic toll ticketing telephone system such as claimed in claim 1, wherein said outgoing trunk includes: marking means connected to said sender operated to indicate the connection of said calling station to said outgoing trunk, sender starting means connected to said sender operated responsive to said calling device at said calling station to initiate operation of said selected sender, sender allotted starting means connected to said outgoing trunk operated responsive to said operation of said calling device at said calling station to initiate operation of said sender allotter means to connect said selected sender means to said outgoing trunk.

3. An automatic toll ticketing telephone system such as claimed in claim 1, wherein said outgoing trunk includes: first pulse repeating means operated in response to said calling device at said calling station to repeat pulses indicative of the called station directory number over said trunk line connecting said outgoing trunk to said incoming trunk, through said incoming trunk to said toll ticketing equipment, second pulse repeating means operated in response to said selected sender to transmit pulses indicative of the directory number of said calling station over said trunk line to said incoming trunk to said toll ticketing equipment, call extending means connected to said second pulse repeating means operated in response to the completion of transmission of said calling station directory number to said toll ticketing equipment to extend a talking path to said called station.

4. An automatic toll ticketing telephone system such as claimed in claim 1, wherein said sender allotter includes: timing means connected to said selected outgoing trunk operated to time the operation of said selected sender, alternate sender selection means operated automatically on release of said sender allotter by said selected sender to select another sender for the next successive operation, extension means operated by said sender alternate selection means to extend said connection from said outgoing trunk to said selected sender, holding means operated responsive to connection of said sender allotter to said outgoing trunk to retain said sender allotter operated until released by said selected sender.

5. An automatic toll ticketing telephone system such as claimed in claim 1, wherein said sender includes: trunk searching means connected to said outgoing trunk operated in response to connection of said calling station to said outgoing trunk to search for said trunk, to identify said outgoing trunk for repetition of the directory number of said calling station to said outgoing trunk and, to establish additional circuit connections between said sender and said outgoing trunk.

6. An automatic toll ticketing telephone system such as claimed in claim 1, wherein said sender includes: detector starting means operated in response to the connection of said calling station to said outgoing trunk to connect said station identification means to said sender and initiate operation of said station identification means, detector output scanning means connected to said station identification means and operated in response to the receipt of said calling station directory number in code form, translation means connected to said scanning means operated in response to receipt of the calling station directory number in code form from said station identification means to convert said directory number received in code form to digital pulses, digit transmission means connected between said outgoing trunk and said translation means operated in response to receipt of digital pulses from said translation means to transmit said calling station directory number to said outgoing trunk in digital pulse form, detector release means connected to said detector operated responsive to the completion of transmission of said directory numbers of said called and calling stations by said outgoing trunk to said second office to release said detector.

7. In an automatic toll ticketing telephone system a toll ticketing office including a plurality of incoming trunks, a plurality of stations including a called station identified by a directory number, toll ticketing equipment connected to said incoming trunk, and first switching means connected to said toll ticketing equipment operable to extend a circuit connection to the called station; a tributary office and a trunk line connecting said toll ticketing office to said tributary office; said tributary office including: a plurality of outgoing trunks, a plurality of stations including a calling station identified by a directory number including a calling device, second switching means connected to said calling station, operated in response to operation of said calling device to extend a circuit connection to a selected one of said outgoing trunks, a plurality of sender means, sender allotter means connected to said plurality of sender means and to said selected outgoing trunk operated in response to the connection of said calling station to said selected outgoing trunk to connect a selected one of said sender means to said outgoing trunk, detection means connected between said second switching means and said plurality of sender means operated in response to the operation of said calling device to transmit the calling station directory number to said selected sender means, said selected sender means operated in response to receipt of the calling station directory number to repeat said number to said outgoing trunk, said outgoing trunk operated in response to reception of the calling station directory number in combination with the operation of said calling device to transmit the directory numbers of both the calling and called stations to said toll ticketing office to extend a circuit connection to said called station.

8. An automatic toll ticketing telephone system such as claimed in claim 7, wherein said outgoing trunk includes: first pulse repeating means operated in response to said calling device at said calling station to repeat pulses indicative of the called station directory number over said trunk line connecting said outgoing trunk to said incoming trunk, through said incoming trunk to said toll ticketing equipment, second pulse repeating means operated in response to said selected sender to transmit pulses indicative of the directory number of said calling station over said trunk line to said incoming trunk to said toll ticketing equipment, call extending means connected to said second pulse repeating means operated in response to the completion of transmission of said calling station directory number to said toll ticketing equipment to extend a talking path to said called station, marking means connected to said sender operated to indicate the connection of said calling station to said outgoing trunk, sender starting means connected to said sender operated responsive to said calling device at said calling station to initiate operation of said selected sender, sender allotter starting means connected to said outgoing trunk operated responsive to operation of said calling device at said calling station to initiate operation of said sender allotter means to connect said selected sender means to said outgoing trunk.

9. An automatic toll ticketing telephone system such as claimed in claim 7, wherein said sender includes: detector starting means operated in response to the connection of said calling station to said outgoing trunk to connect said station identification means to said sender and initiate operation of said station identification means, detector output scanning means connected to said station identification means and operated in response to the receipt of said calling station directory number in code form, translation means connected to said scanning means operated in response to receipt of the calling station directory number in code form from said station identification means to convert said directory number received in code form to digital pulses, digit transmission means connected between said outgoing trunk and said translation means operated in response to receipt of digital pulses from said translation means to transmit said calling station directory number to said outgoing trunk in digital pulse form, detector release means connected to said detector operated responsive to the completion of transmission of said directory numbers of said called and calling stations by said outgoing trunk to said second office to release said detector, and trunk searching means connected to said outgoing trunk operated in response to connection of said calling station to said outgoing trunk to search for said trunk, to identify said outgoing trunk for repetition of the directory number of said calling station to said outgoing trunk and to establish additional circuit connections between said sender and said outgoing trunk.

10. An automatic toll ticketing telephone system such as claimed in claim 7, wherein said sender allotter includes: timing means connected to said selected outgoing trunk operated to time the operation of said selected sender, alternate sender selection means operated automatically on release of said sender allotter by said selected sender to select another sender for the next successive operation, extension means operated by said sender alternating selection means to extend said connection from said outgoing trunk to said selected sender, holding means operated responsive to connection of said sender allotter to said outgoing trunk to retain said sender allotter operated until released by said selected sender.

References Cited in the file of this patent

UNITED STATES PATENTS

| | | |
|---|---|---|
| 2,581,287 | Ostline | Jan. 1, 1952 |
| 2,594,495 | Retllack | Apr. 29, 1952 |
| 2,672,519 | Baker et al. | Mar. 16, 1954 |